(12) United States Patent
Li

(10) Patent No.: US 7,404,255 B2
(45) Date of Patent: Jul. 29, 2008

(54) APPARATUS AND METHOD FOR REMOVING NON-CONDENSING GAS IN HEAT PIPE

(76) Inventor: Jia-Hao Li, No. 2, Lane 127, Dang Ke St., Kang Shan Jen, Kao Hsiung Hsien (TW)

(*) Notice: Subject to any disclaimer, the term of this patent is extended or adjusted under 35 U.S.C. 154(b) by 606 days.

(21) Appl. No.: 11/028,619

(22) Filed: Jan. 5, 2005

(65) Prior Publication Data

US 2006/0144230 A1 Jul. 6, 2006

(51) Int. Cl.
*B23P 6/00* (2006.01)
*B23P 15/26* (2006.01)
*B23K 31/00* (2006.01)
*F28D 15/00* (2006.01)

(52) U.S. Cl. .................. 29/890.032; 29/890.03; 29/890.053; 29/890.054; 29/773; 165/104.18; 165/104.19; 165/104.21; 165/104.26

(58) Field of Classification Search ............. 29/890.03, 29/890.032, 890.053, 890.054, 505, 773, 29/778, 801; 165/104.18, 104.19, 104.21, 165/104.26–27, 104.33
See application file for complete search history.

(56) References Cited

U.S. PATENT DOCUMENTS

| 5,743,014 A * | 4/1998 | Giammaruti et al. ... 29/890.032 |
| 6,230,407 B1 * | 5/2001 | Akutsu ................. 29/890.032 |
| 2004/0194311 A1 * | 10/2004 | Hsu ........................ 29/890.032 |

* cited by examiner

*Primary Examiner*—David P. Bryant
*Assistant Examiner*—Alexander P Taousakis

(57) ABSTRACT

An apparatus and a method for removing non-condensing gas in heat pipe are disclosed, In this method, a resilient pad is abutted against an opening of a pipe body of the heat pipe after a working fluid is filled into the heat pipe. The heat pipe is then heated to remove the non-condensing gas by pressure difference.

4 Claims, 3 Drawing Sheets

```
┌─────────────────────────────────────────────────────────────────┐
│ Filling a working fluid in a pipe body of the heat pipe and reserving │
│           a vent hole at top end of the pipe body.              │
└─────────────────────────────────────────────────────────────────┘
                                 │
┌─────────────────────────────────────────────────────────────────┐
│           Abutting the vent hole with a resilient pad.          │
└─────────────────────────────────────────────────────────────────┘
                                 │
┌─────────────────────────────────────────────────────────────────┐
│ Heating the pipe body until an internal pressure of the pipe body is larger │
│       than an abutting force on the resilient pad and removing  │
│                a non-condensing from the pipe body.             │
└─────────────────────────────────────────────────────────────────┘
```

FIG. 1

APPARATUS AND METHOD FOR REMOVING NON-CONDENSING GAS IN HEAT PIPE

BACKGROUND OF THE INVENTION

1. Field of the Invention

The present invention relates to an apparatus and a method for removing non-condensing gas in a heat pipe, and more particularly to an apparatus and a method for removing non-condensing gas in a heat pipe by pressure difference during degas process.

2. Description of Related Art

The heat pipes are suitable for heat dissipation of electronic device due to high thermal conductivity, fast thermal conductivity, light weight, fixed structure, simple structure and versatile usage. Moreover, the heat pipes can dissipate massive heat with no electrical power consumption. The conventional heat pipes are provided with wick structure on inner wall thereof and the wick structure is made of mesh with capillary function. By the capillary function, the working fluid in the heat pipe can be conveyed.

During fabrication of the heat pipe, vapor generated by heating is used to remove non-condensing gas previously present in the heat pipe. The method is applicable when the work fluid is liquid state in room temperature and is relatively not dangerous, such as water, Freon 113, and ethanol. The working fluid with excessive amount is firstly injected into the heat pipe and the vent hole of the heat pipe is temporarily sealed. Afterward, the heat pipe is heated such that the vapor pressure of the working fluid (for example, water) is 0.11-0.4 MPa, which is larger than the saturated pressure of the working fluid. The temporarily sealed vent hole is opened again to balance pressure inside and outside the heat pipe. At this time, the working fluid is rapidly vaporized and vapor is ejected from the vent hole. The ejected vapor will remove the non-condensing gas in the heat pipe. When suitable amount of non-condensing gas is removed from the heat pipe, the vent hole is sealed again to sufficiently degas the heat pipe. The amount of working fluid filled in the heat pipe should be calculated with reference to heating time, temperature and heat pipe shape to obtain the removing amount of non-condensing gas.

In above-mentioned method, the vapor is firstly confined by the sealed vent hole, the vent hole is not opened until the vapor pressure is sufficient to remove the non-condensing gas. However, the operation of repeatedly sealing the vent hole and then opening the vent hole will harden the opening provided by the vent hole, which may deteriorate the quality of heat pipe for future use.

Therefore, the conventional method for removing non-condensing gas still demands much improvement.

SUMMARY OF THE INVENTION

The present invention is to provide an apparatus and a method for removing non-condensing gas in a heat pipe, wherein the opening of the vent hole is not changed or sealed during the degas operation for the non-condensing gas. The degas amount can be easily controlled and the quality of the heat pipe can be improved.

Accordingly, the present invention provides a method for removing non-condensing gas in heat pipe, comprising steps of:

a) filling a working fluid in a pipe body of the heat pipe and reserving a vent hole at top end of the pipe body;

b) abutting the vent hole with a resilient pad; and c) heating the pipe body until an internal pressure of the pipe body is larger than an abutting force on the resilient pad, whereby a non-condensing is removed from the pipe body.

Moreover, the present invention provides an apparatus for removing non-condensing gas in heat pipe, comprising at least one heating unit, a sealing unit and a resilient pad. The heating unit is used for heating a pipe body of the heat pipe and has a damper to clamp the pipe body. The sealing unit is arranged atop the heating unit and at outer peripheral of an opening of the pipe body, the sealing unit comprising a sealing die and a sealing mechanism for opening and closing the sealing die. The resilient pad is abutted against the opening of a vent hole of the heat pipe.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 1 is a flowchart of method for removing non-condensing gas in heat pipe according to the present invention.

DETAILED DESCRIPTION OF THE INVENTION

Figure 2:
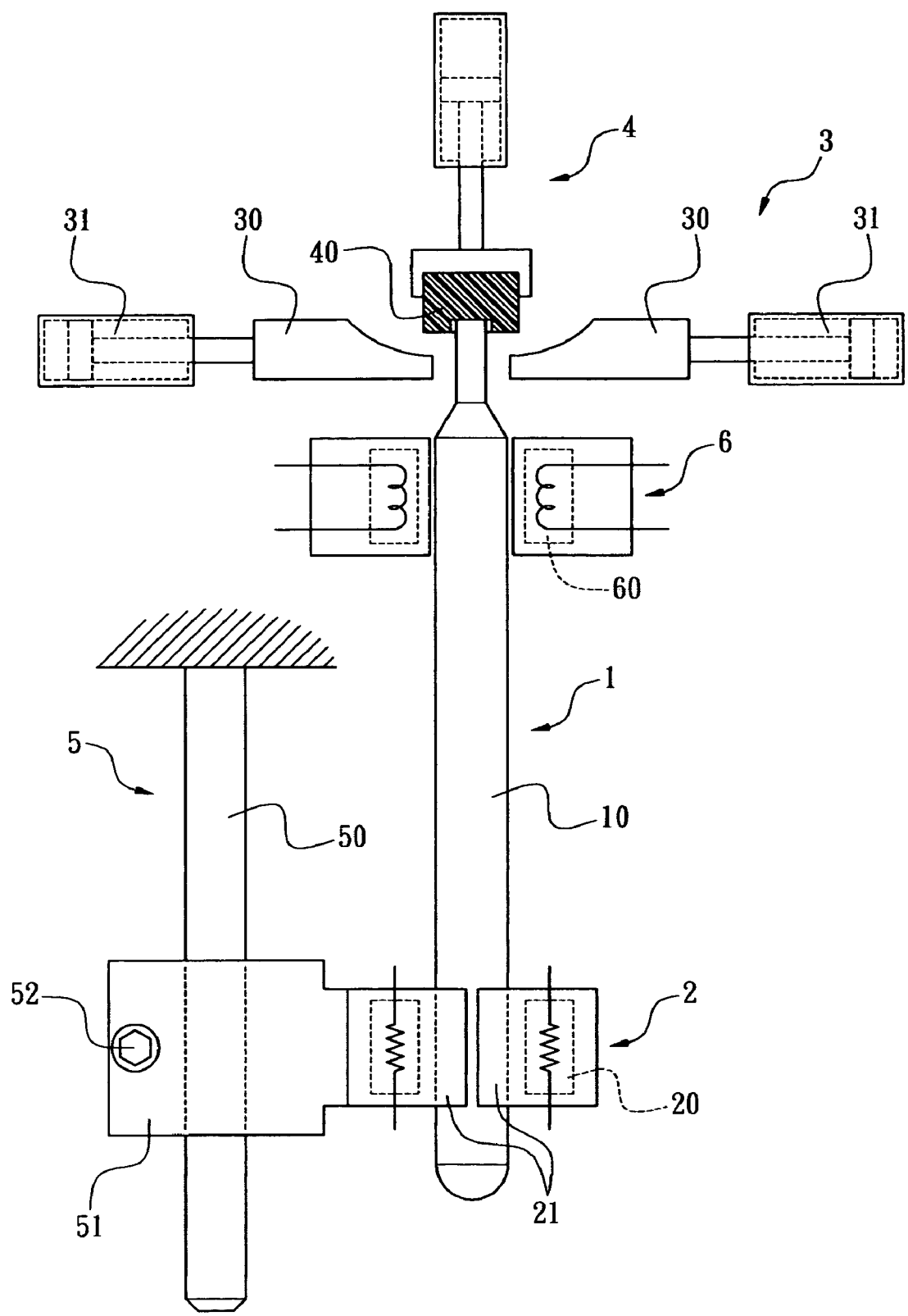
FIG. 2 is a sectional view showing the operation of the present invention.
Figure 3:
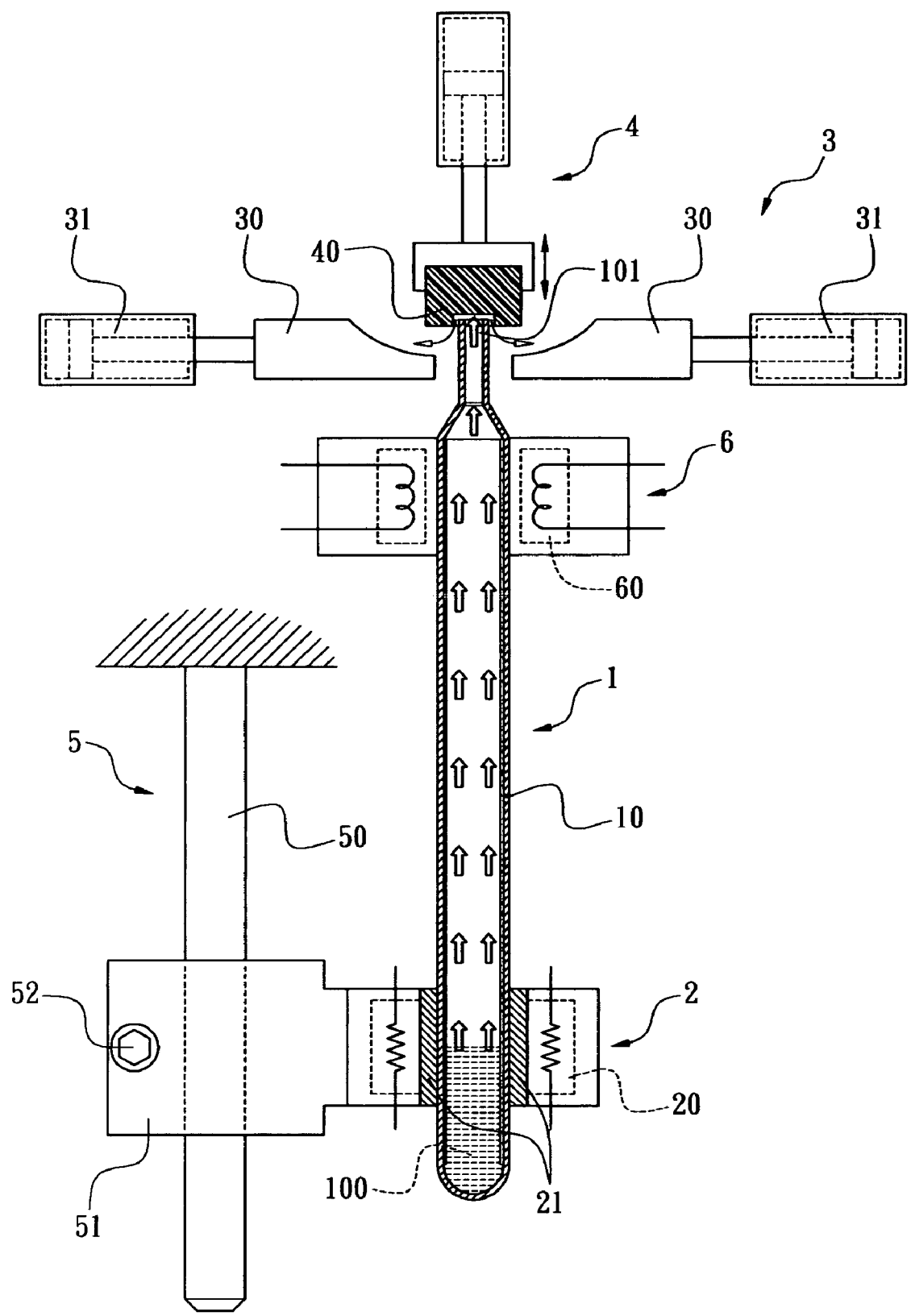
FIG. 3 is another sectional view showing the operation of the present invention.

With reference to FIG. 1 and further with reference to FIGS. 2 and 3, the method for removing non-condensing gas in heat pipe according to the present invention comprises following steps:

a) Filling a working fluid 100 (as shown in FIG. 3) with predetermined amount into a pipe body 10 of a heat pipe 1 and reserving a vent hole 101 atop the pipe body 10. The predetermined amount is slightly larger than the normal amount of the working fluid to be filled into heat pipe 1. The vent hole 101 is an opening portion to be sealed for the pipe body 10 of the heat pipe 1.

b) Using a resilient pad 40 to abut against the vent hole 101 of the pipe body 10. The resilient pad 40 can be made of material with restoring force such as silicone, rubber or lactoprene. The resilient pad 40 is abutted against the vent hole 101 with the force provided by a force-exerting unit 4 such as spring, pneumatic cylinder or oil cylinder.

c) Heating the pipe body 10 until an internal pressure of the pipe body 10 is larger than the abutting force on the resilient pad 40. Therefore, the non-condensing gas (indicated by white arrows shown in FIG. 3) inside the pipe body 10 will push the resilient pad 40 out of the vent hole 101. In this step, the pipe body 10 has initially a boosted pressure, a constant pressure or near atmospheric pressure. As the temperature increases, the internal pressure of the pipe body 10 is increased too. The vapor pressure inside the pipe body 10 will push the resilient pad 40 outward and remove the non-condensing gas out of the pipe body 10 when the internal pressure of the pipe body 10 is larger than the abutting force on the resilient pad 40.

d) Sealing the vent hole 101 when a predetermined amount of vapor is reached or a predetermined time is reached.

Therefore, the method for removing non-condensing gas in heat pipe according to the present invention can be performed by above steps.

With reference now to FIGS. 2 and 3, the present invention also provides an apparatus for removing non-condensing gas from heat pipe. The apparatus for removing non-condensing gas is used with the pipe body 10 of the heat pipe 1 and composed of at least one heating unit 2, a sealing unit 3 and a resilient pad 40.

The heating unit 2 comprises a heater 20 for controlling heating amount and heating temperature and is arranged at lower end of the pipe body 19. The heater 20 is used to heat the pipe body 10. Moreover, additional heaters (not shown) can be provided along lengthwise direction of the pipe body 10. Moreover, a damper 21 is provided for the heating unit 2 and clamps the lower portion of the pipe body 10.

The sealing unit 3 comprises a sealing die 30 and a sealing mechanism 31 for opening and closing the sealing die 30. The sealing unit 3 is placed at upper portion of the heating unit 2 and at outer peripheral of an opening of the pipe body 10. The opening will be the vent hole 101 for removing the non-condensing gas from the heat pipe. Moreover, the sealing die 30 can also be provided with heater (not shown) with temperature control to ensure the temperature near the opening being higher than the saturated temperature of working fluid.

The resilient pad 40 is placed corresponding to the opening of the pipe body 10 and can be made of material with resilient property such as silicone, rubber or lactoprene. The resilient pad 40 is placed on a force-exerting unit 4 such as spring, pneumatic cylinder or oil cylinder. The force-exerting unit 4 provides the force to abut the resilient pad 40 against the vent hole 101.

Moreover, a height-adjusting unit 5 is provided on one side of the pipe body 10 of the heat pipe 1. The height-adjusting unit 5 comprises a guiding rod 50 outside the pipe body 10 and parallel with the pipe body 10 and a sliding stage 51 configured to move upward or downward with respect to the guiding rod 50. The sliding stage 51 can be fixed by a clamping element 52. The clamping element 52 is, for example, a bolt to tighten the sliding stage 51 to a predetermined height. Moreover, the heating unit 2 is also mounted by the sliding stage 51. Therefore, the height of the heating unit 2 can also be adjusted corresponding to the length of the heat pipe 1 such that the damper 21 will clamp on a lower portion of the heat pipe 1 to facilitate the heating unit 2 to heat the heat pipe 1.

Moreover, a pipe-end retainer 6 is placed at lower portion of the sealing unit 3 and at upper peripheral of the pipe body 10. The pipe-end retainer 6 is used with the damper 21 to keep the pipe body 10 of various diameters in erected stand. Moreover, the pipe-end retainer 6 is provided with a heater 60 to heat the upper portion of the pipe body 10

The apparatus for removing non-condensing gas in heat pipe according to the present invention can be assembled according to above description.

To sum up, the method and apparatus for removing non-condensing gas in heat pipe according to the present invention have following advantages:

1. The degas amount of the non-condensing gas can be precisely controlled because the vent hole 101 is not deformed during the degas process for the pipe body 10 of the heat pipe 1. The prior art degas process needs to seal and open the vent hole. Moreover, the pressure in the pipe body 10 of the heat pipe 1 can be stably controlled by the provision of the resilient pad 40.

2. The apparatus for removing non-condensing gas in heat pipe has simple structure and can be modularized for pipe body 10 of different sizes.

3. The opening of the vent hole 101 will not be hardened due to over process. The opening does not repeatedly seal and open according to the present invention.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for removing non-condensing gas in heat pipe, comprising the steps of:
    a) filling a working fluid in a pipe body of the heat pipe and reserving a vent hole at top end of the pipe body;
    b) abutting the vent hole with a resilient pad to create a seal at the vent hole; and
    c) heating the pipe body until an internal pressure of the pipe body is larger than an abutting force on the resilient pad to cause increased pressure within the heat pipe which creates a gap between the vent hole and the resilient pad, whereby a non-condensing gas is removed from the pipe body.

2. The method as in claim 1, wherein the resilient pad in step b) is one of spring, pneumatic cylinder and oil cylinder.

3. The method as in claim 1, wherein the gas pressure of the pipe body in step c) is a boosted pressure, a constant pressure or near atmospheric pressure.

4. The method as in claim 1, further comprising a step d) sealing the vent hole when a predetermined amount of vapor is reached or a predetermined time is reached.

* * * * *